Jan. 19, 1954    N. JOHNSON    2,666,664
HOOKING DEVICE
Filed June 15, 1951    3 Sheets-Sheet 1
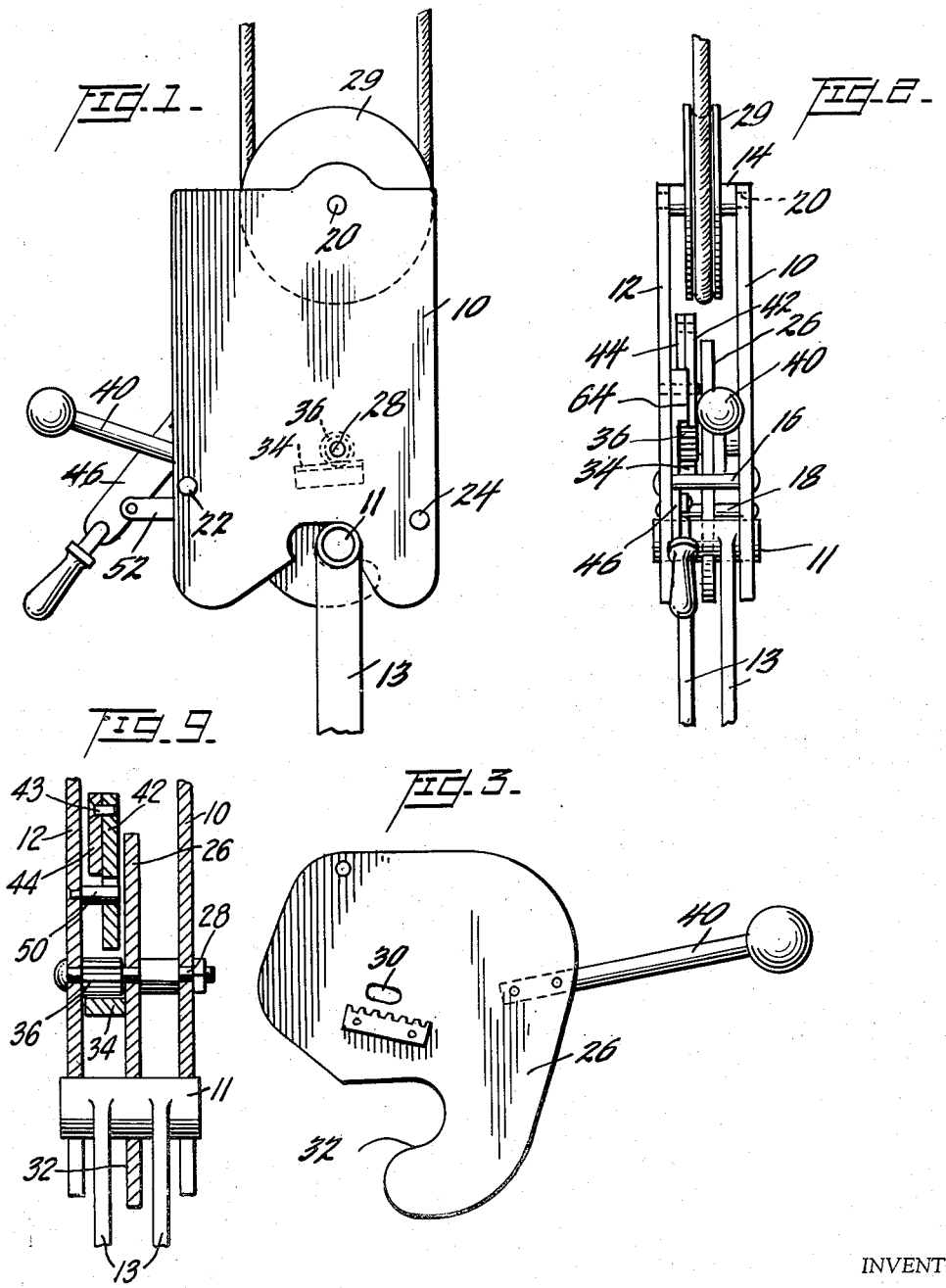
INVENTOR
Nils Johnson
BY Watson, Cole, Grindle and Watson
ATTORNEY

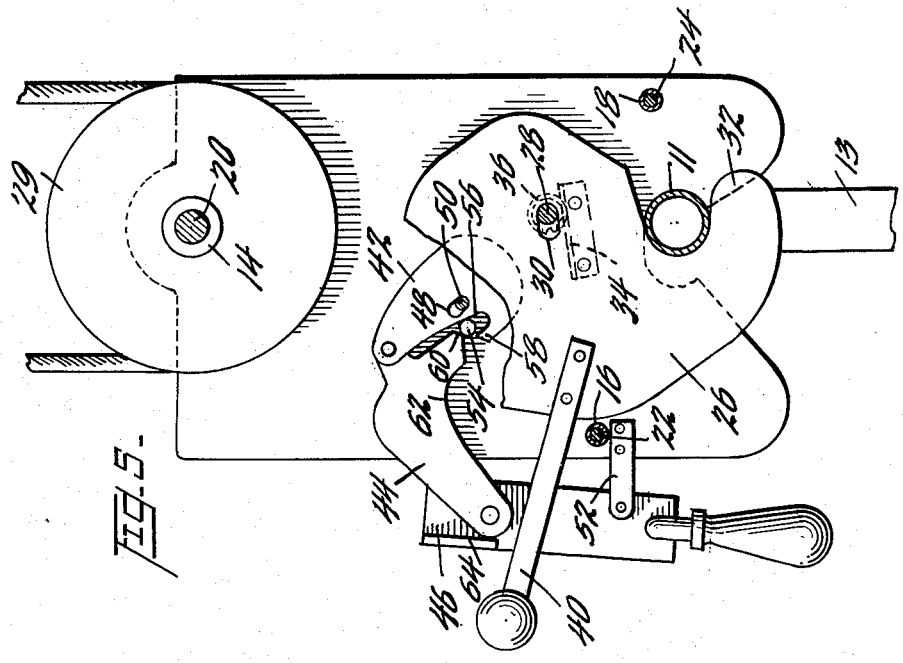

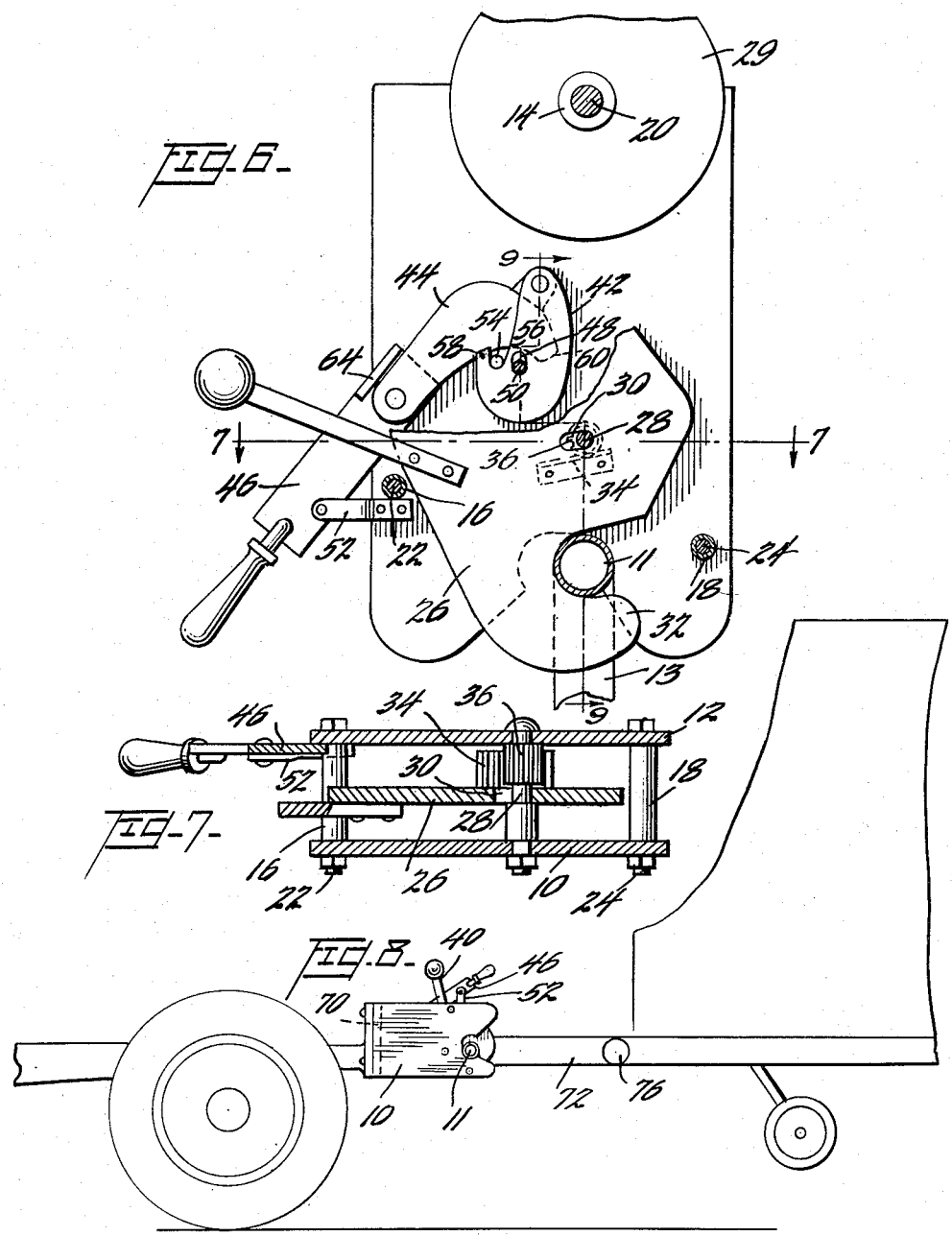

Patented Jan. 19, 1954

2,666,664

UNITED STATES PATENT OFFICE 2,666,664

HOOKING DEVICE

Nils Johnson, Silver Spring, Md.

Application June 15, 1951, Serial No. 231,756

4 Claims. (Cl. 294—83)

This invention relates to hooking or coupling devices of the kind which are capable of releasably lifting or drawing heavy loads, and relates more particularly to devices of this kind which are provided with means for releasably locking the device in its load bearing position.

One of the purposes of this invention is to provide a cargo hook, or a coupling, which is capable of securely retaining heavy loads, and which can be securely locked in its load bearing position by means of a positively acting, simply constructed and easily operated locking device. This invention is particularly applicable to cargo hooks of the kind described and claimed in my United States Patent No. 2,523,434, dated September 26, 1950, and to adaptations of the cargo hooks therein described and claimed to coupling devices.

In hooks or coupling devices of the kind with which this invention is principally concerned, the secure retention of a load and the expeditious release of the load is obtained by designing and constructing the device so that the point at which the load is supported by the hook element of the device and the pivot point at which the hook is supported are in alignment when the hook is in its load bearing position. In such a position the load bearing surface of the hook element is slightly to the side of a dead center, so that the load is safely retained on the hook element subject to quick, easy release. Release of the load is accomplished by swinging the hook slightly so as to cause it to move to the other side of the dead center, and thus position the hook element on its pivot so that the weight of the load rotates the hook element in its load releasing direction. This principle of operation, and the details of construtcion of a hook employing this principle, is fully described in the aforementioned patent.

One of the purposes of this invention is to provide a hook of the kind described, or an adaptation thereof to a coupling device, with a means for locking the hook or coupling device in its load bearing position, subject to quick, easy release irrespective of the magnitude of the load being carried by the hook or coupling device. Other objects and advantages of the invention will be apparent from the following detailed description which is made with reference to the accompanying drawings.

In the drawings:

Figure 1 is a side elevational view of a cargo hook employing the instant invention showing a load supporting pin engaged by the hook;

Figure 2 is a front elevational view of the same hook;

Figure 3 is a side elevational view of the hook element showing the operating handle, the elongated aperture which receives the pivot pin on which the hook element is pivotally supported, and the rack which cooperates with a pinion supported on the pivot pin to shift the hook bodily with respect thereto when it is moved towards its load bearing position;

Figure 4 is a side elevational view of the same hook with one of the frame members of the hook removed, and a portion of the hook element broken away, to illustrate the position and relationship of the hook element and the locking means when the hook is in its open position;

Figure 5 is a view similar to Figure 4 showing the relative position of the parts when the hook element has been moved to its load engaging position and prior to the operation of the hook locking means;

Figure 6 is a view similar to Figures 4 and 5 illustrating the relative position of the hook element and the locking means when the locking means has been operated to secure the hook element in its load bearing position;

Figure 7 is a section on the line 7—7 of Figure 6; and

Figure 8 is an illustration of an adaptation of the hook shown in the preceding figures for use as a universal coupling.

Figure 9 is a cross-sectional view along the line 9—9 of Figure 6.

Referring to Figures 1 and 2, it may be seen that the illustrated hook or coupling comprises two side members 10, 12 which are spaced apart by means of the spacing sleeves 14, 16, 18 through which extend the bolts 20, 22, 24 which at either end are fixed to the respective side members. The hook element 26, shown in detail in Figure 3, is supported on the frame by means of the pin 28, which extends between the side members and passes through the elongated aperture 30 provided in the hook member. The lower corresponding edges of the frame members are recessed to receive a load bearing pin 11 on which sling cables or other suitable load supporting devices 13 are carried. The load bearing pin 11 is held in the hooking device and is supported therein by the hook element 26. The outside dimensions of load bearing pin 11, or other load bearing means received in the hooking device, is such that the movement of the hook element 26 towards its load bearing position is limited during each operation of the device at the point where the locking means, hereinafter described, is correctly positioned with respect to cooperating components for proper operation.

As it may be seen from Figure 6, the pivot pin 28 rests in the right hand end of the aperture 30, as seen in Figure 6, when the hook element is in the load bearing position in which it is illustrated in Figure 6. With the hook element in this position, and the pivot pin in the described position, the load bearing portion 32 of the hook element, the pivot pin 28, and the point of support for the hooking device, are in alignment. The supporting means for the hooking device may consist of a pulley 29 which is rotatably supported on the sleeve 14. In such alignment the hook element 26 is slightly to one side of its dead center with respect to the pivot pin 28 and the weight of the load supported on the hooking element tends to hold the hooking element in its load bearing position. It will be seen, however, that the load may be employed to release the hook element by causing the hook element to shift bodily on its pivot point to the slight extent necessary to move the hook element to the other side of its dead center, in which position the load tends to rotate the hook element to its load releasing position.

Control of the shifting of the hooking element with respect to the pivot is accomplished by means of the rack 34 which is fixed to the hook element in position thereon to mesh with the teeth of the pinion 36 fixedly secured to the pivot pin 28 adjacent to the side member 10 of the frame. The hook element is provided with an operating handle 40 which extends from between the frame members to a position where it may be conveniently grasped. The hook element may be rocked by imparting an arcuate movement to the operating handle. Under heavy load on the hook such movement causes the hook element to first move bodily with respect thereto by reason of the engagement of the rack 34 with the pinion 36 being loose enough to permit the hook to shift from one side of its dead center to the other as previously described. When the hook element has been displaced sufficiently to shift the hook element from the side of the dead center on which it rests in its load bearing position to the other side of the dead center relationship with the pivot, the load will then tend to aid the rotation of the hook element towards its open position, which is that shown in Figure 4.

According to this invention a cargo hook or coupling of this kind is provided with a means for locking the hook in its load bearing position. This locking means comprises a second hook element 42, a link 44, and a locking lever 46. The second hook element is provided with an elongated pivot slot 48 in which is received the pivot pin 50 which is secured to the first hook element 26. The end of the second hook element opposite that in which the mouth portion is formed is pivotally connected at 43 to one end of the link 44 which at its other end is pivotally connected at 45 with the distal end of the locking lever 46. The locking lever, intermediate the pivotal connection to the link and its handle portion, is pivotably supported on a post 52 fixed to the side member 10 of the frame.

The relative positions of the hook element 26 and the component members of the locking means when the hook element is in its open position are illustrated in Figure 4. Downward movement of the operating handle, as viewed in Figure 4, will rotate the hook element 26 to its load bearing position and at the same time, by reason of the engagement of the rack 34 with the pinion 36, will bodily shift the hook element 26 to the side of its dead center relationship with the pivot in which the load tends to pull the hook element into its load bearing position. This movement of the hook element 26 will carry the pivot pin 50 to the left and somewhat downwardly as viewed in Figure 4, thus moving the second hook element 42 to the position in which it is shown in Figure 5 wherein the mouth of the hook is adjacent the locking pin 54 which is fixed to the frame member 10. Towards the end of this movement the locking pin 54 engages the camming surface 56, which is in effect a continuation of the mouth of the second hook element, and causes it to rock clock-wise about the pivot pin 50, thus causing the second hook element to shift bodily with respect thereto and at the same time impart sufficient pivotal movement to the hook element 42 so that the lip 58 of the hook mouth partially encircles the locking pin 54. In this condition the operating handle may be moved upwardly as viewed in Figure 5 to release the hook without the necessity of operating the locking means since the nose 60 provided on the link 44 then rests on the locking pin 54, and the link 44 is free for movement either towards or away from its locked position. If it is desired to lock the hook element 26 in its load bearing position, the locking handle 46 is then moved from the position in which it is shown in Figure 5 to that in which it is shown in Figure 6, thereby causing the second hook element 42 to be rotated clock-wise about its pivot 50 and cause the mouth of the hook element 42 to fully engage the locking pin 54. In this position the locking pin 54 is seized between the mouth of the hook element 42 and the edge 62 of the link 44 which is thereupon prevented from further pivotal movement with respect to the locking lever 46 by means of the flanged edge 64 on the locking lever which then flushly engages the edge of the link which is immediately adjacent the pivotal connection to the locking lever. With the locking means thus locked any tendency of the load to rotate the hook element 26 towards its open position will tend to cause the pivot pin 50 to move to the right as viewed in Figure 6 and swing the hook element 42 counter-clockwise about the locking pin 54. In its thus locked condition, any such tendency towards pivotal movement of the element 26 would result in a straight thrust on the aligned link 44 and locking lever 46 and is resisted so long as the locking lever and the link are permitted to maintain alignment.

It will thus be seen that the load may be quickly and easily released by a downward movement of the locking lever, as viewed in Figure 6, to break the alignment between the lever and the link. This results in the hook element 42 being rotated counter-clockwise to disengage the mouth of the element from the locking pin 54. Thereafter, upward movement of the operating lever 40, as viewed in Figure 6, causes the pivot pin 50 to move to the right and completely disengage the hook element 42 from the locking pin as the hook element 26 is rocked to its load releasing position which is illustrated in Figure 4.

An adaptation of the hooking device, illustrated in Figures 1–7 and described above, as a universal coupling is illustrated in Figure 8. As illustrated in Figure 8, the hooking device may be pivotally secured to the rear portion to a tractor vehicle frame on a vertically disposed pin 70 so that it may swing freely from side to side in a horizontal plane. The tongue 72 of a trailing vehicle may be fixed to the load bearing pin 11 which extends transversely of the frame members and which is received in the arcuate recesses provided in corresponding ends of the frame members. The load bearing pin thus positioned is secured within the coupling device by means of the hook element 26 which is rocked into the position in which the mouth of the element overlies the load bearing pin, as illustrated in Figure 8. The pin 11 may rotate freely within the mouth of the coupling device as the tongue 72 moves in a vertical plane with respect to the coupling device. The tongue may be pivotally connected to the trailing vehicle, as at 76, so that it may move freely in a vertical plane and thus provide a completely universal coupling between the tractor vehicle and the trailing vehicle.

The claims of invention that are desired to be secured by Letters Patent are set forth below:

1. A hooking device comprising a frame member, a pivot pin supported on said frame member, a first hook element pivotally supported on said pin for rocking movement toward and away from load bearing position, said pin extending through an elongated slot in said first hook element to permit shifting of said first hook element bodily with respect to said pivot pin upon said first hook element being rocked as aforesaid, means for locking said first hook element in load bearing position comprising a second hook element pivotally supported on said first hook element, a locking pin fixed to said frame member, said second hook being positioned on said first hook element so that the mouth of the said second hook is placed adjacent said locking pin when said first hook is rocked to its load bearing position, and means for rocking said second hook element about its pivot into locking engagement with said locking pin.

2. A hooking device as claimed in claim 1 in which said second hook element is pivotally supported on said first hook element by means of a second pivot pin fixed to said first hook element and extending through an elongated aperture in said second hook element, said means for rocking said second hook element being pivotally connected thereto, one surface of said second hook element being provided with a camming surface positioned to coact with said locking pin when said first hook element is rocked into its load bearing position, whereby the second hook element is shifted bodily with respect to said second pivot to a point beyond its dead-center relationship therewith, wherein the mouth of said second hook element is adjacent said locking pin.

3. A hooking device as claimed in claim 2 in which said means for rocking said second hook element into locking engagement with said locking pin comprises a hand-operable lever rockably mounted on said frame member and a link pivotally connected at one end to said hand lever and pivotally connected at its other end to said second hook element.

4. A hooking device as claimed in claim 3 in which said hand lever is provided with a flange along one edge which overlies one edge of the portion of said link adjacent its pivotal connection to said lever, whereby the flange prevents pivotal movement of said link in one direction with respect to said lever beyond a linear relationship.

NILS JOHNSON.

References Cited in the file of this patent

UNITED STATES PATENTS

| Number | Name | Date |
|---|---|---|
| 844,710 | Clough | Feb. 19, 1907 |
| 1,386,583 | Paterson | Aug. 2, 1921 |
| 2,523,434 | Johnson | Sept. 26, 1950 |